United States Patent [19]

Waterston et al.

[11] Patent Number: 5,105,972
[45] Date of Patent: Apr. 21, 1992

[54] COLLAPSIBLE AND RESUABLE RECYCLABLE WASTE DISPOSAL RECEPTACLE

[75] Inventors: Rebecca L. Waterston, Plymouth; Mark S. Stoll, Deephaven, both of Minn.

[73] Assignee: Liberty Diversified Industries, New Hope, Minn.

[21] Appl. No.: 648,741

[22] Filed: Jan. 31, 1991

[51] Int. Cl.⁵ .............................................. B65F 1/04
[52] U.S. Cl. .................................. 220/603; 220/908; 220/404
[58] Field of Search ....................... 220/603, 908, 404; 404/6

[56] References Cited

U.S. PATENT DOCUMENTS

| 3,003,678 | 10/1961 | Chase | 220/404 |
|---|---|---|---|
| 3,392,825 | 7/1968 | Gale et al. | 220/404 |
| 3,394,832 | 7/1968 | McAllister et al. | 220/908 |
| 3,658,233 | 4/1972 | Voytko | 220/908 |
| 4,438,606 | 3/1984 | Chardon et al. | 220/603 |
| 4,475,101 | 10/1984 | Kulp et al. | 220/603 |
| 4,657,176 | 4/1987 | Matsubara | 220/908 |
| 4,921,196 | 5/1990 | Rudko | 220/404 |
| 5,018,637 | 5/1991 | Miller | 220/404 |

FOREIGN PATENT DOCUMENTS

| 0322972 | 7/1989 | European Pat. Off. | 220/908 |
|---|---|---|---|
| 2910144 | 9/1980 | Fed. Rep. of Germany | 220/908 |

Primary Examiner—Stephen Marcus
Assistant Examiner—S. Castellano
Attorney, Agent, or Firm—Moore & Hansen

[57] ABSTRACT

A waste disposal receptacle comprising a receptacle body and a lid. The receptacle body has a bottom and four side walls which may be formed from one unitary blank or a pair of interconnected blanks. The side walls may be scored to be folded flat in either a square parallelogram configuration or a hexagonal configuration. The side walls define trapezoidal apertures through which weights such as sand bags, bricks, or boards may be placed onto the bottom to weigh down and stabilize the waste disposal receptacle. Two of the opposing side walls define upwardly projecting ridges that are received through correspondingly aligned slots in the lid, the ridges and lid holding a thin plastic bag within the waste disposal container in an upright and open position. The lid may define one or more waste receiving openings particularly designed for recyclable waste, such as a pair of circular openings for receiving metal cans and glass bottles. The receptacle body and lid are preferably constructed from a double-faced corrugated plastic sheet material.

4 Claims, 4 Drawing Sheets

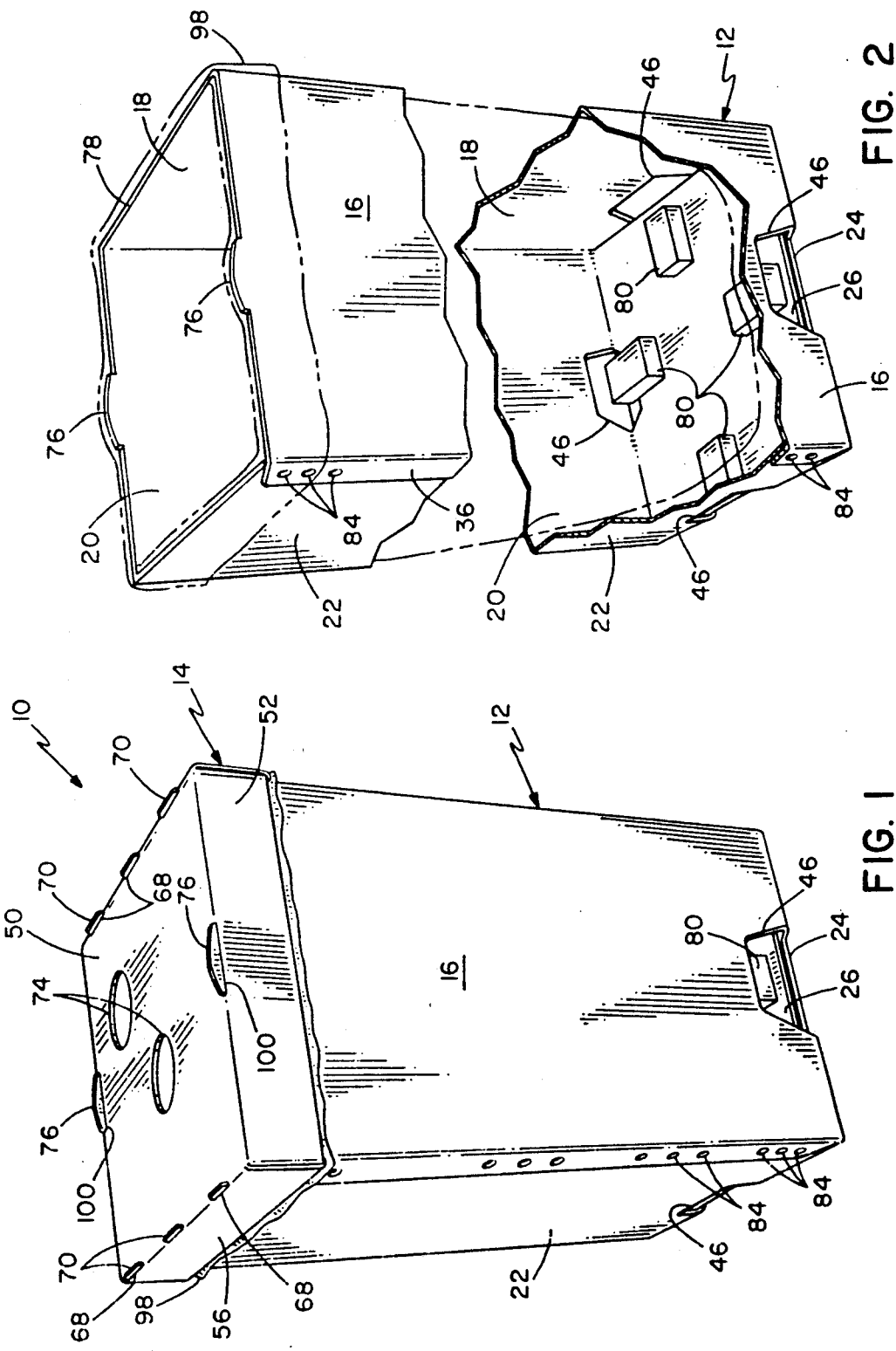

2

COLLAPSIBLE AND REUSABLE RECYCLABLE WASTE DISPOSAL RECEPTACLE

BACKGROUND OF THE INVENTION

This invention relates generally to containers for depositing recyclable waste materials, and particularly to a collapsible and reusable recycling container to be placed at public events.

Various trash and waste receptacles are known for use in public areas such as on urban sidewalks, parks, or in stadiums, arenas, and other public buildings and high traffic areas. These receptacles generally comprise a heavily weighted exterior container formed from metal or cement, and either a fixed or removable interior container designed to hold a plastic bag. These receptacles may include a removable or pivotable lid which permits a filled bag to be removed and replaced. The lids of some receptacles define rain covers with side openings to permit trash to be disposed, while some embodiments have lids defining a circular opening having a diameter of approximately eight inches or greater and a generally conical collar surrounding the opening to direct refuse through the opening.

However, these types of receptacles do not function well for sorting and disposing of recyclable waste materials, since the openings admit virtually all types of waste materials. This problem is particularly acute in situations where large numbers of people congregate and food items are served, such as at fairs, conventions, parades, and the like, since people will tend not to observe instructions regarding sorting of recyclable waste material, and will dispose of all waste materials in one location as quickly as possible.

BRIEF SUMMARY OF THE INVENTION

It is therefore one object of this invention to design a collapsible and reusable waste disposal receptacle particularly suited for use in collecting recyclable waste materials, such that said waste disposal container may be placed adjacent to permanently located conventional waste disposal receptacles for use during special public events such as fairs, parades, parties, conventions, and the like involving increased numbers of users.

It is a further object to design the above waste disposal receptacle such that it may be suited for use with particular types or groups of recyclable wastes, such as glass and cans, while permitting unsorted waste materials to be disposed in an adjacent waste receptacle.

It is a related object of this invention to design the above waste disposal receptacle such that it will not be subject to damage by weather, refuse, abuse, and rigorous use.

It is another object of this invention to design the above waste disposal receptacle such that it may be easily assembled, and knocked down for storage and transportation.

Briefly described, the waste disposal receptacle of this invention comprises a receptacle body and a lid. The receptacle body has a bottom and four side walls which may be formed from one unitary blank or a pair of interconnected blanks. The side walls may be scored to be folded flat in either a square parallelogram configuration or a hexagonal configuration. The side walls define trapezoidal apertures through which weights such as sand bags, bricks, or boards may be placed onto the bottom to weigh down and stabilize the waste disposal receptacle. Two of the opposing side walls define upwardly projecting ridges that are received through correspondingly aligned slots in the lid, the ridges and lid holding a thin plastic bag within the waste disposal container in an upright and open position. The lid may define one or more waste receiving openings particularly designed for recyclable waste, such as a pair of circular openings for receiving metal car's and glass bottles. The receptacle body and lid are preferably constructed from a double-faced corrugated plastic sheet material.

BRIEF DESCRIPTION OF THE DRAWINGS

FIG. 1 is a perspective view of the waste disposal receptacle of this invention showing the lid in place on the receptacle body;

FIG. 2 is a partially broken away perspective view of the waste disposal receptacle of FIG. 1 with the lid removed;

DESCRIPTION OF THE PREFERRED EMBODIMENTS

Figure 3:
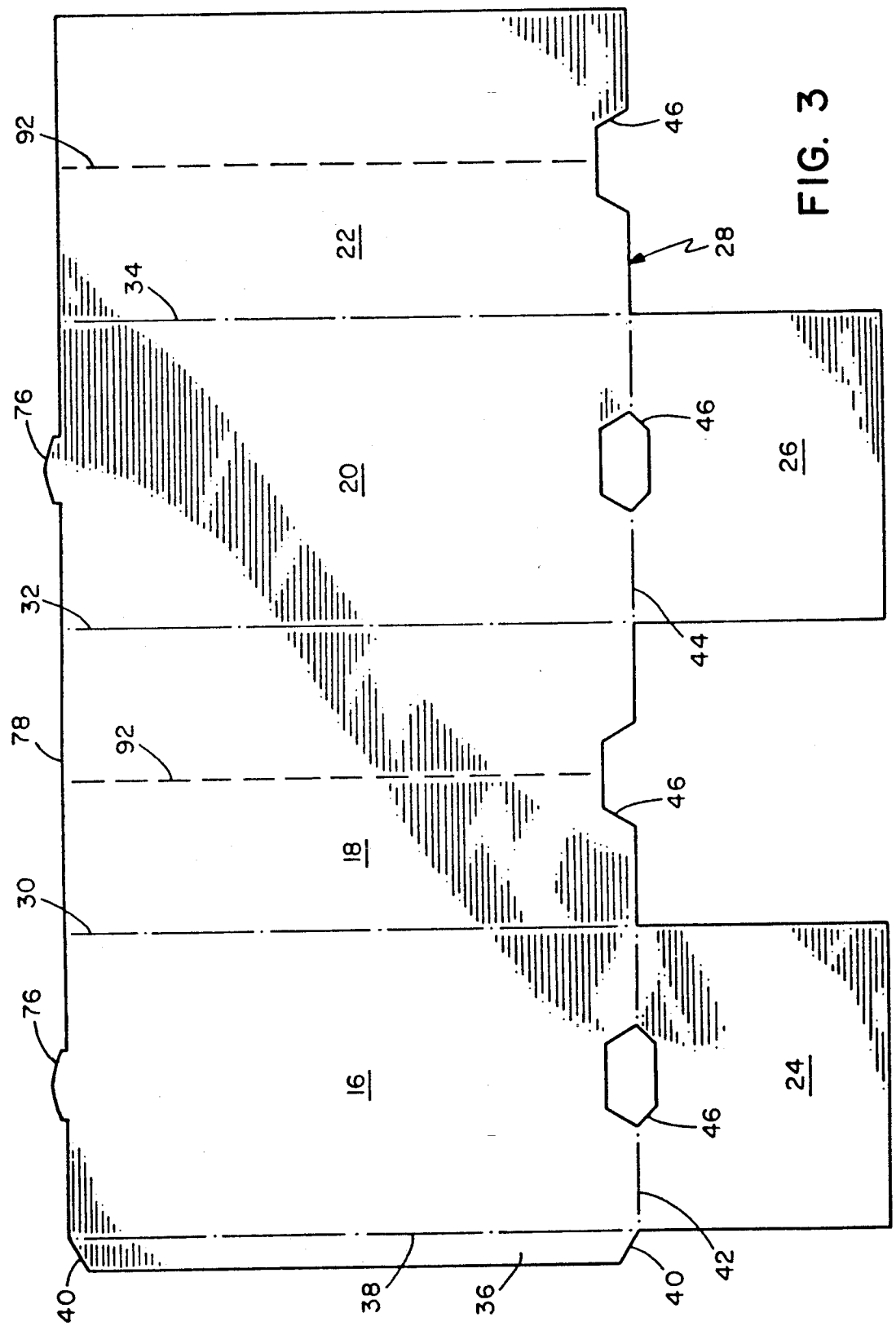
FIG. 3 is a top plan view of the unitary blank used to form one embodiment of the receptacle body of the waste disposal receptacle of FIG. 1.

The waste disposal receptacle of this invention is shown in FIGS. 1-8 and referenced generally therein by the numeral 10.

Referring particularly to FIGS. 1 and 2, it may be seen that the waste disposal receptacle 10 includes a receptacle body 12 and a removable lid 14.

The receptacle body 12 is comprised of four generally
y rectangular side walls 16, 18, 20, 22, each of Which is disposed in a generally upright orientation, and a pair of bottom panels 24, 26 which are disposed in a generally horizontal orientation at the base of the side wall panels 16–22.

Referring to FIG. 3, the unitary or one-piece blank 28 used to form the waste disposal receptacle 10 is shown. In the unitary blank 28, each of the side walls 16–22 extend from and are hingedly connected to one another along parallel single-scored fold lines 30, 32, 34. A side wall securing flap 36 extends from one end side wall 16 and is hingedly connected thereto along a single-scored fold line 38, the side wall securing flap 36 extending along substantially the entire height of the side wall 16 and having a pair of tapered or angled ends 40. Each of the bottom panels 24, 26 extend from and are hingedly connected to the bottom edge of an alternating pair of the side walls 16, 20 along single-scored fold lines 42, 44.

Referring again to FIGS. 1 and 2, it may be seen that each of the side walls 16–22 defines a generally trapezoidal bottom aperture 46 centered along the bottom edges thereof, with the bottom apertures 46 extending across and overlapping the single-scored fold lines 42, 44 defining the bottom edges of the side walls 16, 20 to which the bottom panels 24, 26 are connected, as shown particularly in FIG. 3.

Figure 5:
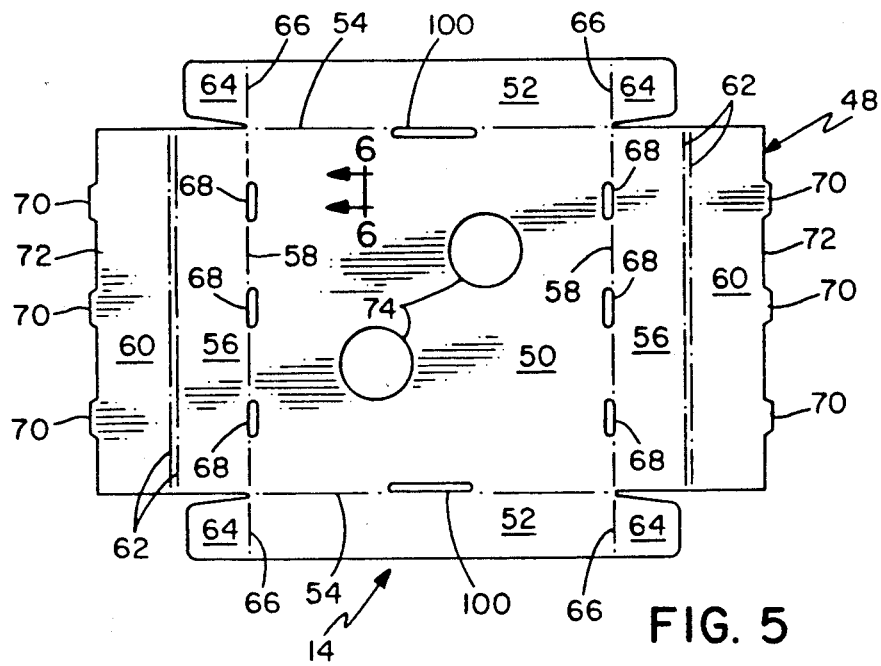
FIG. 5 is a top plan view of the blank used to form the lid of the waste disposal receptacle of FIG. 1.

Referring to FIGS. 1 and 5, it may be seen that the lid 14 is folded to a generally upright configuration from a planar blank 48, said blank 48 comprising a horizontal covering panel 50, a pair of side panels 52 extending from and hingedly connected to the side edges of the horizontal covering panel 50 along single-scored fold lines 54, and a pair of end panels 56 extending from and hingedly connected to the end edges of the horizontal covering panel 50 along single-scored fold lines 58. A pair of end foldover panels 60 extend from and are hingedly connected to the outer or bottom edges of the end panels 56 along double-scored fold lines 62. A pair of side flaps 64 extend from and are hingedly connected to each of the side panels 52, each side flap 64 being connected to the corresponding end of the side panel 52 along a single-scored fold line 66.

The lid 14 is folded to its generally upright configuration by folding the side panels 52 upwardly across single-score lines 54 until the side panels 52 are generally perpendicular to the horizontal covering panel 50. The side flaps 64 are then folded inwardly across single-scored fold line 66 until the side flaps 64 are generally perpendicular with the side panels 52 and aligned over the single-scored fold lines 58 connecting the horizontal covering panel 50 to the end panels 56. The end panels 56 and end foldover panels 60 are folded upwardly across single-scored fold lines 58 until the end panels 56 are generally parallel with and closely confronting the adjacent side flaps 64, and the end foldover panels 60 are folded inwardly and downwardly across double-scored fold lines 62 such that the side flaps 64 are disposed between the associated end panel 56 and end foldover panel 60. The horizontal covering panel 50 defines a plurality of lid locking apertures 68 aligned along the single-scored fold lines 58, each of the locking apertures 68 engagingly receiving one of a plurality of corresponding aligned locking tabs 70 extending outwardly or downwardly from the outer or lower edge 72 of the end foldover panels 60.

In this manner, the horizontal covering panel 50 of the lid 14 forms a covering portion for the open top receptacle region of the receptacle body 12, and the side panels 52, end panels 56, and end foldover panels 60 form a depending skirt portion which receives and frictionally engages the top of the receptacle body 12 when the lid 14 is mounted thereon as shown in FIG. 1.

The horizontal covering panel 50 of the lid 14 further defines one or more waste receiving openings 74 of varying shape. The preferred waste receiving openings 74 comprise a diagonally disposed pair of 4" circular openings for receiving metal cans or glass bottles. Other waste receiving openings 74 which might be particularly suitable include an 8" square or diamond opening 74 for general waste, or a 15" by 2" slot with rounded ends for receiving newspaper and similar papers.

Referring again to FIGS. 2 and 3, it may be seen that the blank 28 forming the receptacle body 12 further defines a pair of retaining tabs 76 extending upwardly a short distance from the top edge 78 of the receptacle body 12 centered along each of two opposing side walls 16, 20. Each retaining tab 76 has a shallow taper or bevel leading to a pointed top, the width of each retaining tab 76 being several times the height of the retaining tab 76.

The receptacle body 12 is folded to its generally upright configuration defining the open-top interior receptacle region as shown in FIG. 2, with the side walls 16, 18, 20, 22 being folded across the single-scored fold lines 30, 32, 34 such that each side wall 16–22 is generally perpendicular to each of the adjacent connected side walls 16–22, the side walls 16–22 thereby forming an open-ended rectangular box-like configuration. Each of the bottom panels 24, 26 are folded upwardly or inwardly across single-scored fold lines 42, 44 until the bottom panels 24, 26 are oriented generally perpendicular to the side walls 16–22, and the receptacle body 12 may then be turned to an upright or upstanding position resting on the bottom panels 24, 26 and the bottom edges of the side walls 16–22. One bottom panel 24, 26 will rest in generally parallel abutting contact on top of the remaining bottom panel 26, 24, respectively.

A plurality of weights 80 are inserted through the bottom apertures 46 and may be partially received therethrough when placed on top of the bottom panels 24, 26. The overlapped bottom panels 24, 26, weights 80, and the skirt portion of the lid 14 will cooperate to maintain the receptacle body 12 in the shape of a regular perpendicular or rectangular parallelogram.

In the preferred embodiment, the side walls 16–22 are preferably secured in a closed box form by aligning the side wall securing flap 36 attached to one end side wall 16 over an equal width portion the opposing edge 82 of the opposing end side wall 22, such that the edge 82 is aligned with and along the single-scored fold line 38 connecting the side wall securing flap 36 to the side wall 16, and securely fastening the side wall securing flap 36 to the opposing edge 82 of the opposing end side wall 22 using a plurality of sonic welds 84 o other suitable conventional fastening means.

Figure 4:
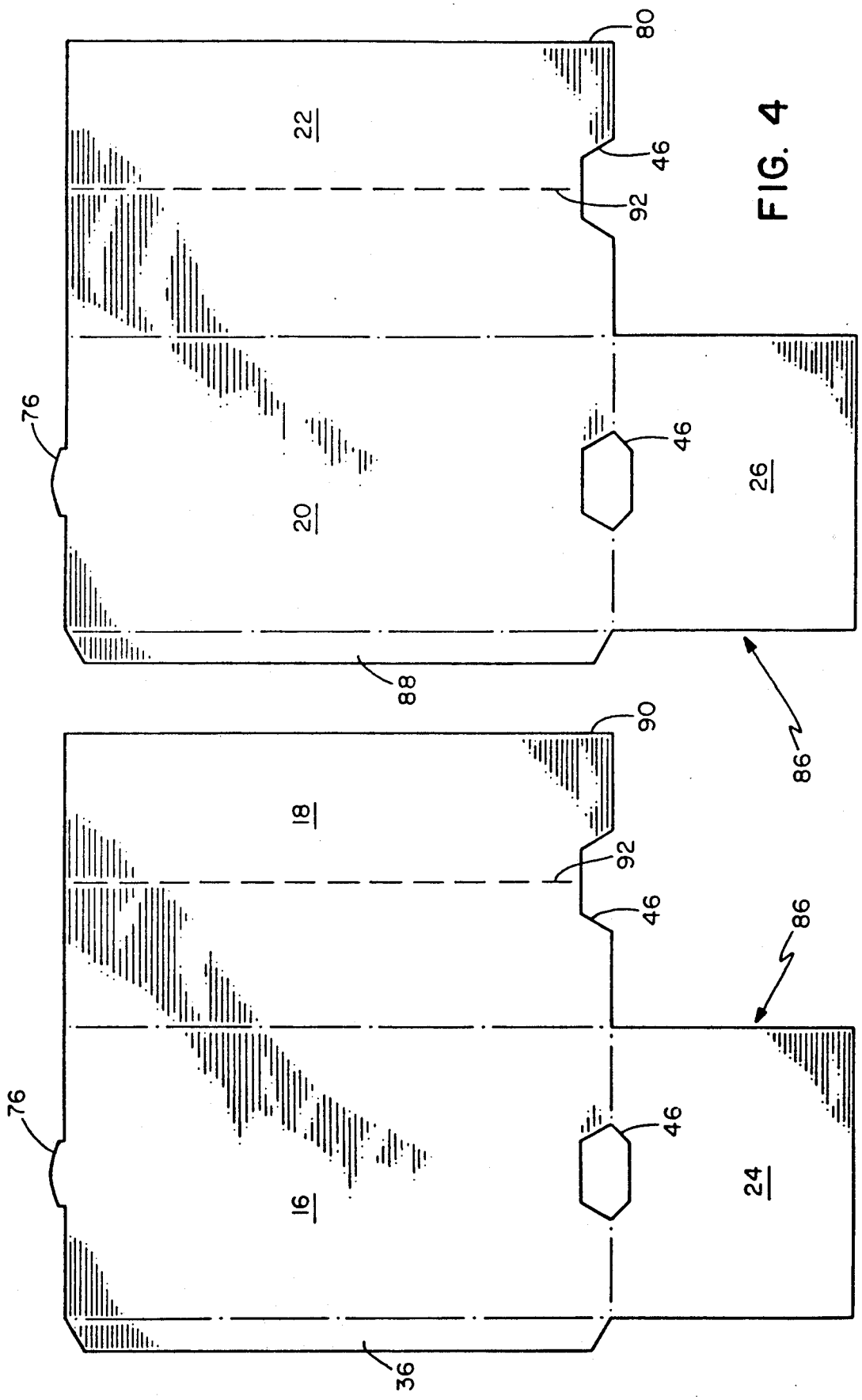
FIG. 4 is a top plan view of the pair of blanks blank used to form one alternate embodiment of the receptacle body of the waste disposal receptacle of FIG. 1.

Referring to FIG. 4, it may be seen that in an alternate embodiment of the waste disposal receptacle 10, the receptacle body 12 is formed from a pair of substantially identical interconnected blanks 86. The blanks 86 are substantially similar to the unitary blank 28 divided in two sections along the center single-scored fold line 32, with one of the two blanks 86 including an additional or second side wall securing flap 88. The two blanks 86 are connected by fastening the side wall securing flap 36 of one blank 86 to the exposed edge 90 of the end side wall 22 of the opposing blank 86 using sonic welds or similar fastening means, and fastening the second side wall securing flap 88 to the exposed free edge 90 of the first blank 86, respectively.

Referring to FIGS. 3 and 4, it may be seen that two alternating or opposing side walls 18, 22 from which the bottom panels 24, 26 do not extend, may include a full height single-scored fold line 92 extending vertically along the centerline of those side panels 18, 22 (or a predetermined equal distance from the single-scored fold lines 32, 34.)

Figure 7:
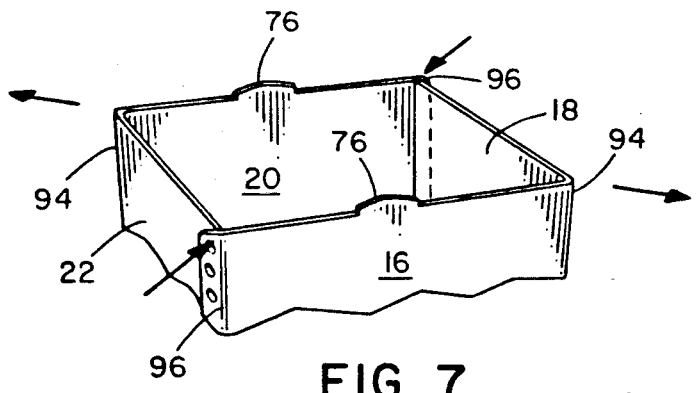
FIG. 7 is a broken away perspective view of the receptacle body of the waste disposal receptacle of FIG. 1 indicating the movement of the side wall panels and upright corners when the receptacle body is folded flat in the parallelogram configuration.
Figure 8:
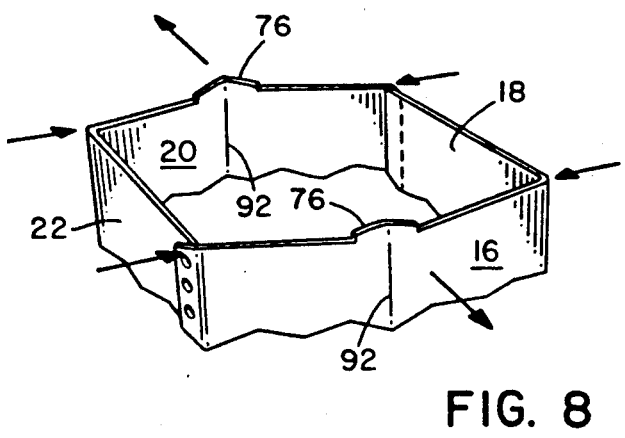
FIG. 8 is a broken away perspective view of the receptacle body of the waste disposal receptacle of FIG. 1 indicating the movement of the side wall panels and upright corners when the receptacle body is folded flat in the hexagonal configuration.

To fold or collapse and store the receptacle body 12 of the waste disposal receptacle 10, two opposing corners 94 of the upright receptacle body 12 may be pulled outwardly diametrically away from one another as shown in FIG. 7, thus causing the remaining intermediate corners 96 to move inwardly toward one another until those intermediate corners 96 are closely proximate to one another and the receptacle body 12 is folded to a flat configuration with the side walls 16, 18 and 20, 22 pivoting into parallel alignment and contact. The bottom panels 24, 26 may be folded downwardly and outwardly to extend from the folded receptacle body 12, but are preferably folded upwardly and received between the folded side walls 16-22.

Alternately, in an embodiment in which the two opposing side walls 18, 22 include full height single-scored lines 92, the side walls 18, 22 may be flexed so that the center portion of each side wall 18, 22 and the single-scored fold lines 92 move outwardly away from one another and fold inwardly on themselves, while the remaining side walls 16, 20 move inwardly toward one another until the receptacle body 12 is folded flat. If the single-scored fold lines 92 are centered on the side walls 18, 22, the opposing side walls 16, 20 will remain parallel and aligned with one another, while those side walls 16, 20 will remain parallel but move laterally in opposing directions if the single-scored fold lines 92 are not centered.

When the receptacle body 12 is assembled and folded to its upright configuration, a thin plastic bag 98 may be opened and inserted into the interior receptacle region, with the top lip or gusset of the bag 98 being folded outwardly over the top edge or rim of the receptacle body 12 as shown in FIG. 2. The lid 14 is then mounted onto the top of the receptacle body 12 so that the retaining tabs 76 are received through a pair of aligned retaining slots 100 defined by and extending entirely through the horizontal covering panel 50 of the lid 14 aligned parallel with and along two opposing edges of the horizontal covering panel 50 adjacent to and centered along the side panels 52. The retaining tabs 76 and retaining slots 100 thereby serve to maintain the lid 14 on and aligned with the receptacle body 12, and hold the bag 98 in an upright and open position even when filled with waste materials.

Figure 6:
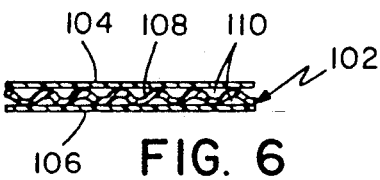
FIG. 6 is a cross section view of the double-faced corrugated plastic sheet material used to form the lid and the receptacle body taken through line 6—6 of FIG. 5.

Referring to FIG. 6, it may be seen that the waste disposal receptacle 10 is preferably constructed from a double-faced corrugated plastic sheet material 102 such as polyethylene. The double-faced corrugated plastic sheet material 102 includes a pair of generally parallel spaced-apart planar plies 104, 106, and a convoluted intermediate ply 108 which extends between and is integrally formed with and bonded to the planar plies 104, 106. The convoluted intermediate ply 108 forms a multiplicity of generally parallel air pockets 110 that together with the convolutions of the convoluted intermediate ply 108 define a longitudinal grain extending along the blank. This grain is preferably oriented to extend parallel with the height of the side walls 16-18.

In the preferred embodiment, the unitary blank 28 has an overall length of 77-7/16" and side walls 16-22 having a height of 34", with the side wall securing flap 36 having a width of 1¼". The embodiment having two interconnected blanks 86 would have dimensions corresponding to side wall 16-22 and side wall securing flap 36 dimensions equal to those of the unitary blank 28. The preferred size of the bottom apertures 46 provides for a 4" high opening along the side walls 16-22 with the aperture extending inwardly 1" into the corresponding bottom panel 24, 26, with a 4" width measured along the centered top edge of the aperture and side edges extending downwardly therefrom at an approximately 45° angle. The height of the depending skirt portion of the lid 14 is preferably about 4".

A molded-plastic or metal tray (not shown) having an upwardly extending angled lip may be placed within the interior receptacle region of the receptacle body 12 proximate to the bottom thereof, and resting on top of the weights 80, to protect the bag 98 from being torn by the weights 80 and to eliminate pockets between the bottom of the bag 98 and the bottom panels 24, 26 caused by the weights 80 that would permit sharp pieces of waste materials to puncture the bag 98.

While the preferred embodiment of the above waste disposal receptacle 10 has been described in detail with reference to the attached drawing figures, it is understood that various changes and adaptations may be made in the waste disposal receptacle 10 without departing from the spirit and scope of the appended claims.

What is claimed is:

1. A waste disposal receptacle suited for the disposal of recyclable waste materials, said waste disposal receptacle being selectively weighted down and stabilized by a plurality of weights, said waste disposal receptacle comprising:

a receptacle body, said receptacle body defining a receptacle region and including a plurality of generally upright side walls and at least one bottom panel, said plurality of generally upright side walls being generally pivotally connected to one another, said at least one bottom panel being generally pivotally connected to at least one of said plurality of generally upright side walls, said plurality of generally upright side walls defining at least one aperture through which at least one of the plurality of weights may be at least partially received, such that one of the plurality of weights contacts and rests upon the at least one bottom panel; and a lid, said lid being mountable on said receptacle body in covering relation to said receptacle region, said lid defining at least one waste receiving opening communicating with said receptacle region of said receptacle body.

2. The waste disposal receptacle of claim 1 wherein the number of upright side walls is four and the number of the apertures is four, each of the plurality of generally upright side walls defining one of the apertures.

3. The waste disposal receptacle of claim 1 wherein the at least one aperture is defined by said at least one of the plurality of generally upright side walls and one of the at least one bottom panel extending from and connected to said at least one of the plurality of generally upright side walls.

4. The waste disposal receptacle of claim 1 wherein the at least one aperture forms a generally trapezoidal shape extending through the at least one of the plurality of generally upright side walls.

* * * * *

UNITED STATES PATENT AND TRADEMARK OFFICE
CERTIFICATE OF CORRECTION

PATENT NO. : 5,105,972

DATED : April 21, 1992

INVENTOR(S) : Rebecca L. Waterston & Mark S. Stoll

It is certified that error appears in the above-identified patent and that said Letters Patent is hereby corrected as shown below:

Column 2, line 7, delete "car's" and insert --cans-- therefor.

Column 2, line 22, delete "blank".

Column 2, line 53, delete "y" and remove extra line.

Signed and Sealed this

Twenty-eighth Day of September, 1993

Attest:

BRUCE LEHMAN

Attesting Officer     Commissioner of Patents and Trademarks